United States Patent
Grube

[15] 3,704,507
[45] Dec. 5, 1972

[54] METHOD OF FABRICATING AND ATTACHING PIERCE NUTS TO A PANEL

[72] Inventor: William L. Grube, Lake Bluff, Ill.

[73] Assignee: MacLean-Fogg Lock Nut Co., Mundelein, Ill.

[22] Filed: March 23, 1970

[21] Appl. No.: 21,777

[52] U.S. Cl. .................. 29/417, 29/432.2, 29/509, 85/32, 206/56 A, 221/71, 151/41.72, 151/41.73
[51] Int. Cl. .................. B23p 17/00, B23p 11/00
[58] Field of Search ..... 29/417, 432.2, 432, 509, 513; 85/32, 32.1; 24/73 PF, 73 R; 221/71, 73; 206/56 A, 56 AB; 151/41.72, 41.73; 227/86

[56] References Cited

UNITED STATES PATENTS

| | | | |
|---|---|---|---|
| 1,757,142 | 6/1930 | Renner | 29/417 UX |
| 1,852,978 | 4/1932 | Mitchel | 29/417 UX |
| 2,187,647 | 1/1940 | Double et al | 29/432 UX |
| 2,652,942 | 9/1953 | Muchy | 29/432 UX |
| 2,749,606 | 6/1956 | Donahue | 29/432 |
| 2,754,516 | 7/1956 | Gasstrom | 29/417 X |
| 3,152,628 | 10/1964 | Strain et al | 29/432 X |
| 2,604,986 | 7/1952 | Berg | 206/56 AB UX |
| 3,007,169 | 11/1961 | La Fleur et al. | 227/86 |
| 3,140,010 | 7/1964 | Double | 221/73 |
| 3,177,915 | 4/1965 | La Fleur et al. | 151/41.72 |
| 3,624,867 | 12/1971 | Reynolds | 24/73 PF |

*Primary Examiner*—Charlie T. Moon
*Attorney*—Davis, Lucas, Brewer & Brugman

[57] ABSTRACT

A strip containing a series of flanged pierce nuts connected by flexible and severable sections for use in automatically applying flanged pierce nuts to a panel. The method of forming the strip is also disclosed and comprises providing a blank strip formed with opposed laterally extending flanges, perforating the strip between the flanges, and then slotting the strip between adjacent perforations to form the nut body, after which the sides of the strips are straightened, the holes are threaded and the strip coiled into predetermined lengths. Further, there is disclosed the method of applying pierce nuts from such strip to a panel.

5 Claims, 13 Drawing Figures

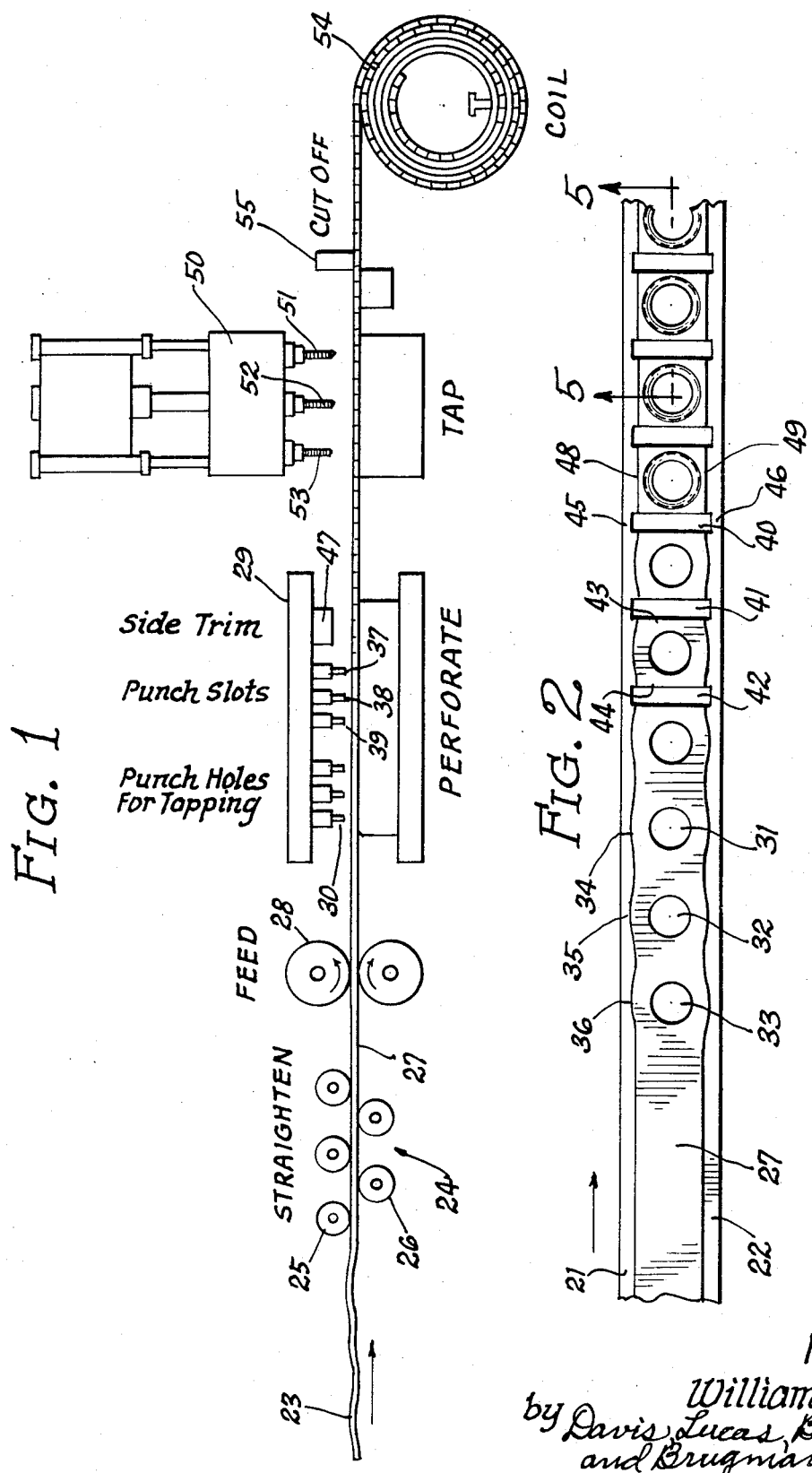

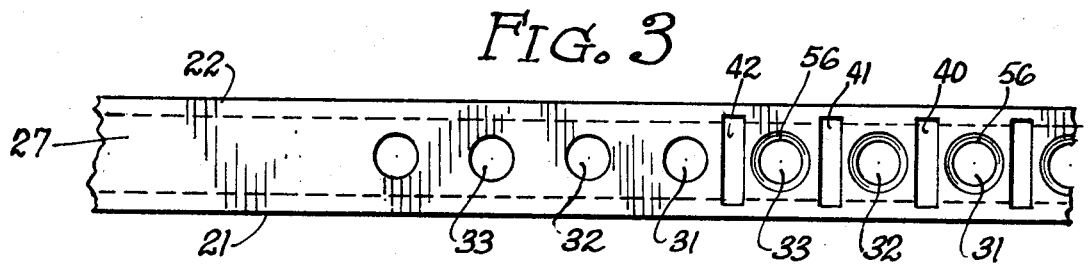
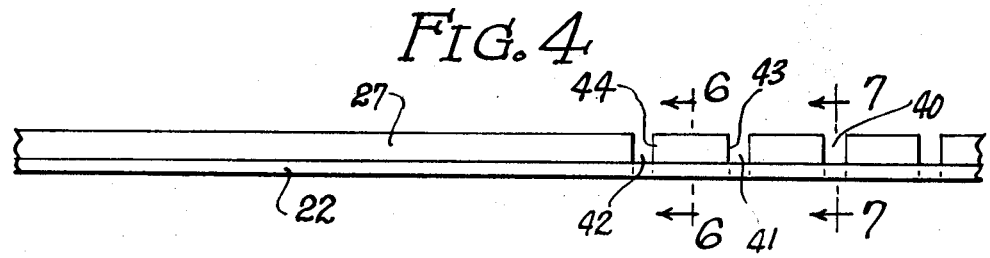
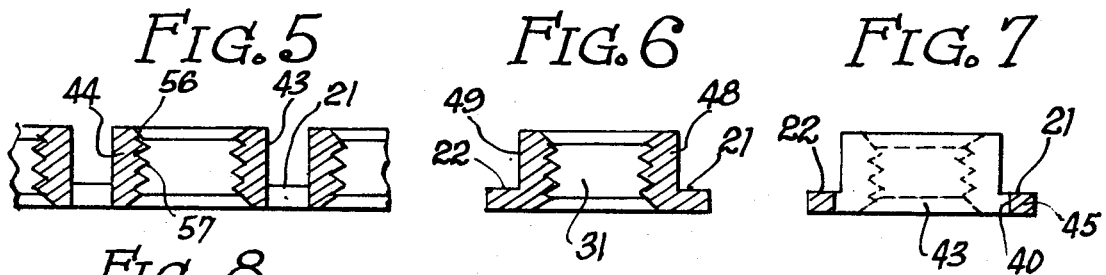
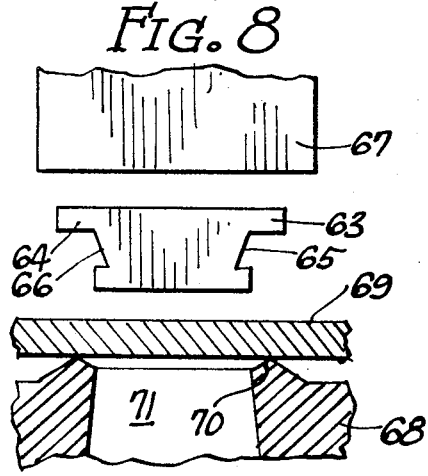
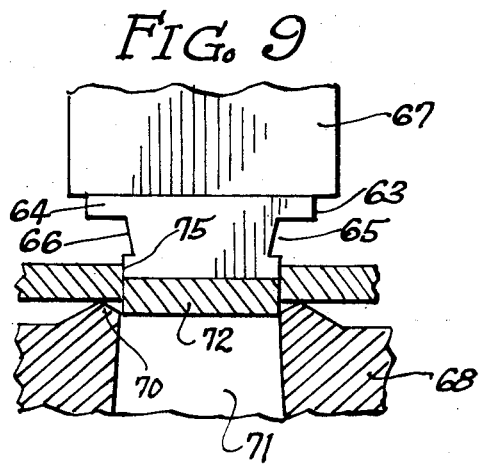
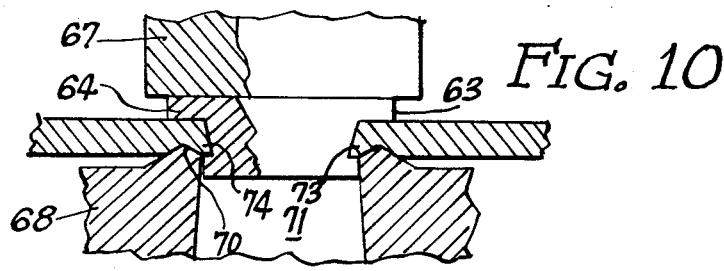

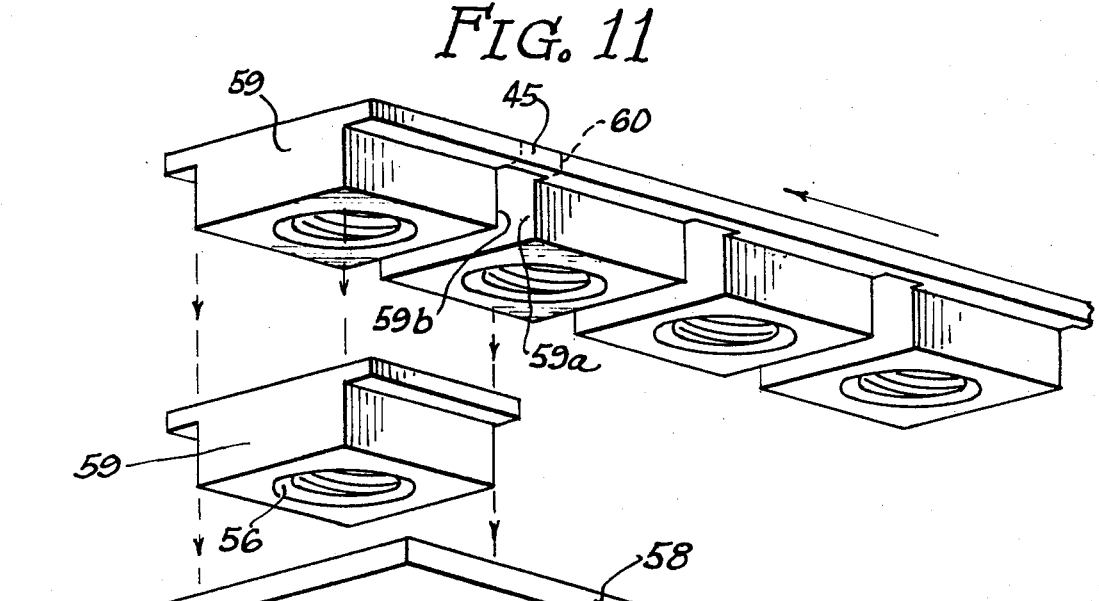
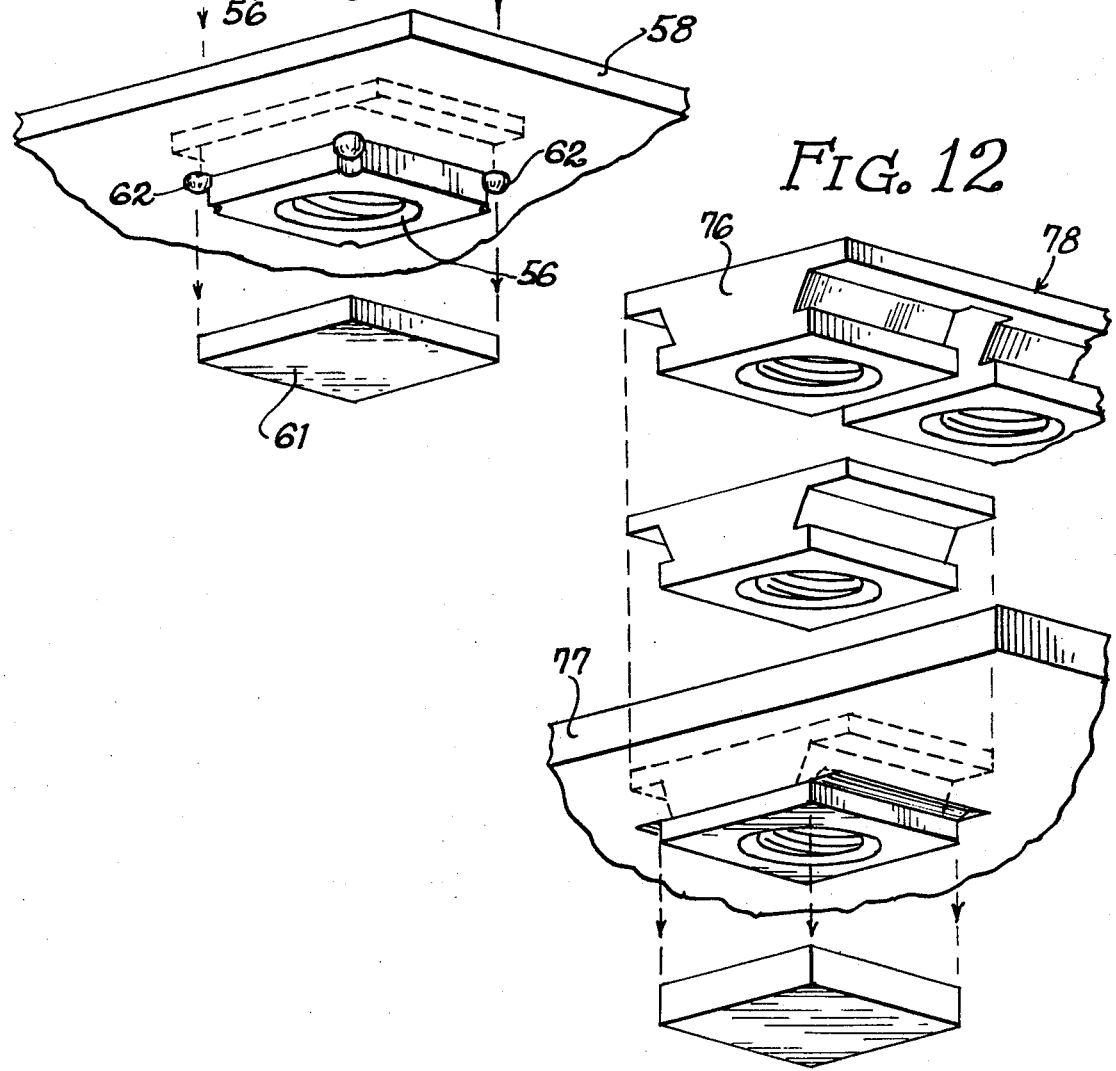

METHOD OF FABRICATING AND ATTACHING PIERCE NUTS TO A PANEL

This invention relates to nuts connected together in strip form and to methods of forming and applying such nuts to a panel. The invention will be described with reference to its application to pierce nuts, which are nuts used as punches to form openings for themselves in a panel to which they are to be rigidly secured.

At present, the use of pierce nuts is limited to extremely high volume applications, since the handling, selecting, orienting and feeding of individual nuts from a hopper requires a large amount of expensive tooling and set-up. Furthermore, existing systems for handling pierce nuts are highly specialized in the sense that the entire system of feeding, selecting and applying the nuts must be custom designed for each application inasmuch as the form of the panel and the location of the pierce nut on the panel vary in each instance.

It is an object of this invention to provide a method of handling pierce nuts which eliminates the steps of selecting, orienting and locating said nuts prior to the application of the nuts to a panel.

Another object of this invention is the provision of a plurality of pierce nuts as a series of connected nuts forming a strip which may be coiled and then fed from such coil to a punch press where they are individually severed from the coil and applied to a panel.

Yet another object of this invention is to provide a method of forming pierce nuts from a strip of metal as a series of connected nuts, the connections being flexible to permit coiling the strips after the nuts are formed and severing them at their point of application to a panel.

These and other objects of this invention will become apparent from the following detailed description of preferred embodiments of the novel strip of connected nuts, the method of forming the strip and the method of applying the nuts to a panel, all of which are depicted in the accompanying drawings in which:

FIG. 1 is a schematic diagram of the sequence of steps performed upon a strip of metal to produce a coil of connected pierce nuts;

FIG. 2 is a plan view of the strip showing its progressive transformation by the steps in the method of this invention;

FIG. 2a is a cross section through the strip in its original form;

FIGS. 3 and 4 are respectively bottom and side views of the strip of FIG. 2;

FIG. 5 is an enlarged side elevation in section of a fragment of the strip of FIG. 2 taken along line 5—5 of FIG. 2;

FIGS. 6 and 7 are enlarged transverse sections of the strip taken along lines 6—6 and 7—7 of FIG. 4;

FIGS. 8, 9 and 10 are enlarged fragmentary elevations in sections of a modified form of pierce nut, the Figures showing three sequential steps in the application of such nut to a panel;

FIG. 11 is a bottom view in perspective showing the steps in applying the pierce nut of FIG. 2 to a panel; and FIG. 12 is a bottom view in perspective showing the steps in applying the modified form of pierce nut of FIGS. 8, 9 and 10 to a panel.

The general objectives of this invention are attained by forming nuts in a punch press from strip stock having a predetermined rolled section but instead of shearing the nuts completely from the strip at the end of the forming operation, the strip is merely perforated between the nuts in such a manner as to leave a thin web of material between the nuts. The web will be durable enough to make it possible for the strip to be coiled into a roll and thereafter shipped and handled as a finished product. The rolls of nuts may thus be sold and transported to customers as correctly oriented and precisely located nuts for use with a tool which feeds the nuts from the coil, one at a time to a die for further processing. The latter may, for example, locate the nut on a panel to which it is to be attached, sever it from the strip, pierce the panel with it and clinch the nut to the panel.

The initial rolled section may be purchased from a mill to have the precise cross sectional profile and metallurgy desired, but it is also possible for the nut manufacturer to provide tooling for shaping the initial rolled section to have the cross section he desires.

Referring now to FIGS. 1 and 2 for a detailed description of the invention, the material from which the nuts are made is shown as a strip of steel having the desired physical characteristics purchased in coil form from a steel mill which has rolled or otherwise produced a predetermined initial cross section in the strip. The fastener selected to illustrate this invention is a pierce nut which is flanged on two of its opposed sides, the flanges acting as abutments when the nut is installed on a panel to resist pulling the nut through the panel. Accordingly, as shown in FIG. 2a, the contour of the starting material is generally rectangular, as shown at 20, with flanges 21 and 22 formed on opposite sides of the rectangular section. The starting material may be supplied in coil form, and when pulled from its initial coil, the strip containing the section shown in FIG. 2 may be somewhat bent, as shown at 23 in FIG. 1. The first operation, therefore, to be performed on the strip is a straightening operation. This is shown at 24 in FIG. 1, the strip straightener comprises a series of staggered rolls 25, 26 from which the strip, designated 27, is passed to a pair of feed rolls 28.

From the feed rolls, the strip 27 is advanced to a punch press at which may be set up a progressive die 29, the first operation in which is a perforating operation. It is contemplated that several nuts will be formed simultaneously and accordingly three cylindrical punches 30 are provided at this station, said punches creating three spaced round holes 31, 32 and 33 in the strip 27. The creation of holes 31, 32 and 33 is accompanied by a spreading of the material of the strip 27 laterally to form bulges 34, 35 and 36 on both sides of strip 27.

The next operation performed by progressive die 29 is a slotting operation which not only forms the remaining two sides of the finished nut but removes enough material from between adjacent nuts to leave only a part of each flange 21, 22 to connect adjacent nuts together. Thus, die 29 is provided with punches 37, 38 and 39 which are of elongate rectangular cross section and form the slots 40, 41 and 42, respectively. It may be noted that said slots extend into the flanges 21 and 22 so that the sides 43 and 44 of a nut are completely formed, while at the same time the flanges 21 and 22 have been reduced in width to form relatively thin but durable connecting sections 45 and 46 between adjacent nuts.

The third operation performed by progressive die 29 is a side trimming operation designed to remove the bulges 34, 35 and 36 from the nuts. The side trimming punch is shown at 47 and comprises a simple straight-sided punch which shaves the material of the bulges off the sides and coins it into the flanges 21 and 22. This operation finishes off the other two straight sides 48 and 49 of the nut.

Generally accepted design practice for nuts requires that the holes be countersunk to at least the root diameter of the threads to facilitate starting the screw or bolt into the nut. A countersinking operation may be incorporated in the side trimming operation of the progressive die 29. The countersinking may be performed as a coining operation by the upper part of the trimming die, pins (not shown) on said upper part entering the perforations to locate the strip correctly relative to the trimming die while at the same time forming the countersink. FIG. 5 shows the countersink 56 of one hole 33 as an example.

From die 29, the strip is moved into a tapping machine shown at 50 which may be designed to tap a plurality of holes simultaneously. Because of the lateral space required for each tapping unit, the holes tapped simultaneously may not be adjacent one another, but the first tap 51 will tap the first hole of one plural-hole unit operated on by die 29, the second tap 52 will tap the second hole of the adjacent plural-hole unit, and the third tap 53 will tap the third hole of the third adjacent plural-hole unit.

From the tapper 50 the strip 27 is coiled upon a suitable mandrel (not shown) to form a coil 54 containing a predetermined number of nuts. The coil is then severed from the strip by a cut-off die 55 and is ready for shipment to a customer who will apply the nuts individually to a panel in a suitable manner and with the aid of suitable tools and dies.

During the coiling process, the strip is bent at the connecting sections 45 and 46 so that the nut portion bounded by the sides 43, 44, 48 and 49 is not in any manner distorted to impair its usefulness as a fastener.

FIGS. 5, 6 and 7 show sections through the strip 27 after the holes have been tapped and the strip is ready for coiling. Each of the holes has threads 57 cut thereinto, so that the nut is complete with the side flanges 21 and 22 required for pierce nuts, and the connecting sections between nuts, as shown in FIG. 7, are reduced to only that cross section which is determined to be necessary to permit handling the nuts as a strip. Obviously, the amount of material left in the sections 45 can be varied by appropriately lengthening or shortening the punches 37, 38 and 39 to remove more or less of the flanges 21 and 22.

Referring now to FIG. 11, the manner in which the nuts are applied to a panel 58 will now be described. Said nuts are moved to the left, as viewed in FIG. 11, in the strip form into an appropriate die which severs a nut 59 from the strip at a line shown dotted at 60 and which is merely an extension of the transverse wall 59 of the nut. In the same operation, the connecting segment 45 may also be removed to leave a clean wall 60 on the opposite side of said nut. Where the nut will be concealed in the final installation of the panel to which it is attached, the connecting segment may be left on the nut since it in no way hinders the piercing or clinching operation to be performed on the nut. The severed nut is then operated upon by a suitable punch such as that shown at 67 in FIG. 8 and advanced by said punch through the panel 58 and upon an appropriate die. Said die causes nut 59 to pierce panel 58 and remove therefrom a substantially rectangular slug 61 while at the same time forming in the corners of the protruding nut, shaved or upset metal 62, as shown in FIG. 11, which bears against the bottom surface of panel 58 to clinch nut 59 to said panel. It is understood that suitable locating means will be provided (not shown) for the nut 59 on panel 58.

Although this invention has been described with reference to clinch nuts which have flat sides parallel to the axis of the nut for use with the piercing and clinching method disclosed in my aforesaid copending application, the method is also applicable with modifications to pierce nuts which depend upon an inwardly directed movement of the panel material toward the sides of the nut for a clinching action.

One such modification is shown in FIGS. 8, 9 and 10 from which it may be observed that the nut is of substantially the same size and proportion and made from substantially the same strip of metal as the nut of FIGS. 2–7, except that the sides adjacent the flanges 63, 64 have been undercut, as shown at 65 and 66 in FIG. 8. In that figure, a suitable punch 67 and die 68 are used, the latter being adapted to move the material of the panel 69 inwardly into the undercut 65 and 66 to clinch the nut to the panel 69. Thus, die 68 has a tapered bead 70 formed on each side of an opening 71 therein upon which panel 69 initially rests.

The first stage in the operation of the die of FIG. 8 is shown in FIG. 9 and comprises displacing a slug 72 from the central regions of the die 68. The final operation is shown in FIG. 10 and comprises displacing material 73 and 74 from the sides of the opening 75 (FIG. 9) in the panel 69 inwardly of the nut into the undercuts 65 and 66.

FIG. 12 shows a nut 76 on the end of a strip formed with undercut sides as it is applied to a panel 77 in accordance with the dies shown in FIGS. 8, 9 and 10. It may be apparent that the method of forming a strip 78 of connected undercut nuts 76 is substantially identical with that disclosed in connection with the straight-sided nuts of FIG. 2, except that the punch 47 is omitted and special grinders (not shown) or other surface shaping tools are substituted for punch 47 to remove the bulges formed in the perforating operation.

It may thus be observed that by forming pierce nuts as readily severable parts of a strip, the usual nut orienting, selecting and feeding operations are completely eliminated and the handling of the nuts can be effected without the use of containers. Furthermore, in the application of the nuts to a panel from a strip, it is possible in one stroke of a press to sever a nut from a strip, pierce a panel with the nut and clinch the nut to the panel.

I claim:

1. The method of fabricating and attaching pierce nuts to a panel comprising the steps of providing a relatively inflexible continuous metal blank for forming a plurality of spaced nut bodies, said blank having a thickness of substantially that of the finished pierce nuts, forming a rigid abutment extending laterally of the blank and of a lesser thickness than the nut body, punching material out of the thicker portion of the blank to form a relatively flexible metallic connector between spaced nut bodies of less cross-sectional area than the cross-sectional area of the abutment, piercing and tapping the nut bodies to form a strip of substantially completely shaped spaced pierce nuts joined together by said relatively flexible metallic connectors, feeding an end nut of said strip under a plunger, severing said end nut of said strip from said strip with said plunger, piercing a panel with said nut body, pushing said nut body through the pierced panel until the abutment is adjacent to said panel, and clinching the nut body to the panel on the side thereof opposite the abutment.

2. The method according to claim 1, said severing, piercing, pushing and clinching steps being performed with a single stroke of a plunger.

3. The method according to claim 1, comprising the further steps of forming the abutment as a laterally extending first flange on said nut body, forming a second laterally extending flange on the opposite side of the nut body from said first flange, said nut bodies and flanges forming a single metallic strip.

4. The method of attaching pierce nuts to a panel as defined in claim 1, and wherein the securement of the nut in its mounted position on the panel is effected by a die and comprises the deformation of the panel adjacent the mounted nut.

5. The method of attaching pierce nuts to a panel as defined in claim 1, and wherein the securement of the nut in its mounted position on the panel is effected by a die and comprises the deformation of segments of the nut into clamping engagement with the panel.

* * * * *